Aug. 12, 1969    H. KARSH    3,460,527
ELECTROCARDIOGRAPHIC DEVICE FOR DETECTING QRS WIDENING
Filed Oct. 12, 1966
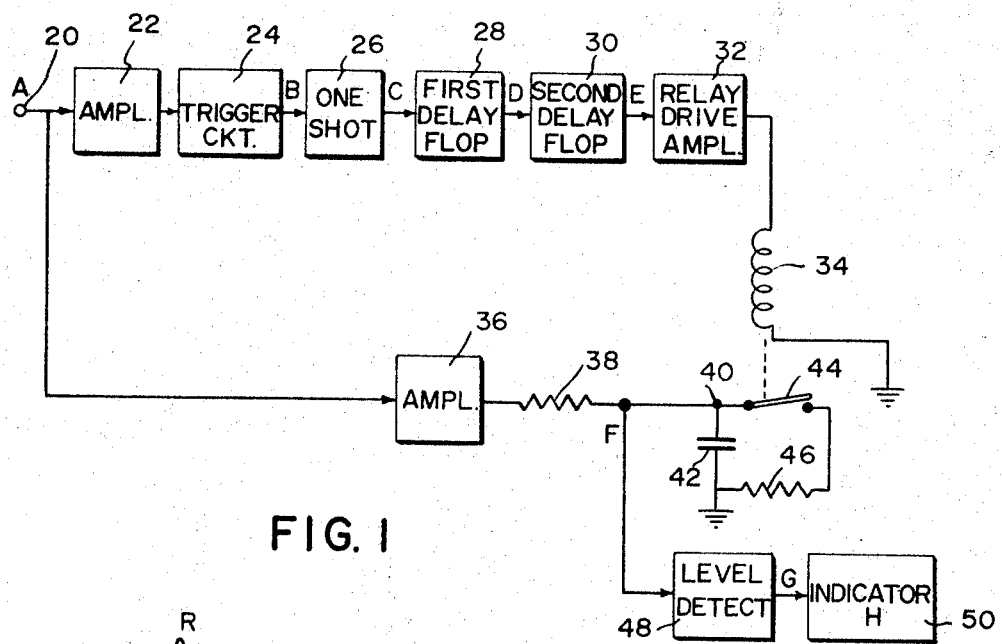
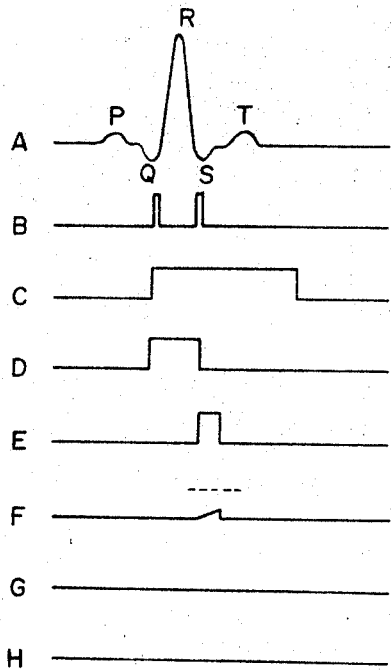
FIG. 2
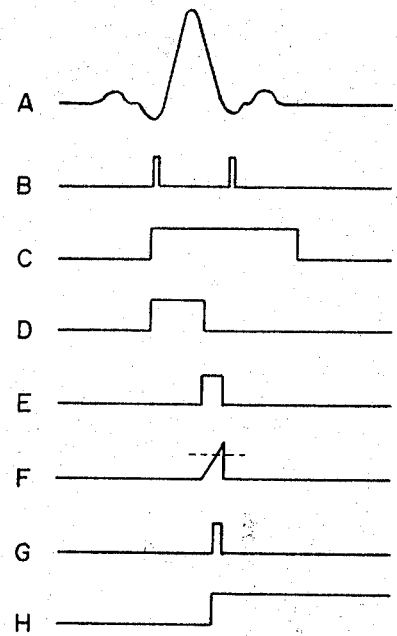
FIG. 3
INVENTOR.
HERBERT KARSH
BY
Robert J. Schiller
ATTORNEY

United States Patent Office 3,460,527
Patented Aug. 12, 1969

3,460,527
ELECTROCARDIOGRAPHIC DEVICE FOR DETECTING QRS WIDENING
Herbert Karsh, Lexington, Mass., assignor to Lexington Instrument Corporation, Waltham, Mass., a corporation of Massachusetts
Filed Oct. 12, 1966, Ser. No. 586,149
Int. Cl. A61b 5/04
U.S. Cl. 128—2.06                                5 Claims

ABSTRACT OF THE DISCLOSURE

A device for detecting QRS widening in heart-beat waveforms, in which device a first signal is produced upon detection of a Q wave, the signal having a fixed interval approximately equal to the normal wave duration between the Q and S wave maxima. The first signal then is used to trigger a second signal having a fixed interval approximately equal to the duration of expected widening of the QRS complex. The heartbeat waveform is sampled on an absolute basis during the second signal. Only samples above a threshold amplitude indicate QRS widening inasmuch as a widened waveform will have portions of its R wave occurring within the sampling period.

---

This invention relates to electrocardiology, and more particularly to novel means for electrically detecting the occurrence of occasional widening of the heart beat, QRS, electrocardiographic wave complex.

Occasional widening of the QRS wave complex of a heart beat pulse is symptomatic of serious, often lethal, cardiac difficulties. Such widening is sometimes difficult to detect, particularly in cases where the occurrence is infrequent or irregular. Devices providing automatic, continuous, electrical indication of potentials corresponding to heart functions are common, such as the well-known electrocardiographs. Unfortunately, to observe pulse widening, very carful, visual observation and analysis of an electrocardigraphic trace by a highly skilled, attending physician or technician is required.

The present invention is intended to free individuals from the need for continuous visual monitoring of an electrocardiographic record by providing automatic indication of the occurrence of QRS pulse widening.

A principal object of the present invention is therefore to provide novel electronic instrumentation, particularly adapted for continuous monitoring of heart beat wave forms so as to detect heart pulses having QRS widening. Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 is a diagram, partly schematic and partly block showing the elements of a novel circuit embodying the principles of the present invention;

FIG. 2 is a timing diagram on a common time base showing exemplary, idealized waveforms occurring at various points in the diagram of FIG. 1 in response to a normal heart beat waveform; and FIG. 3 is a timing diagram on a common base showing exemplary idealized waveforms occurring at various points in the diagram of FIG. 1 in response to QRS widening heart beat waveforms.

Generally, QRS widening is detected by the present invention by using means responsive to the waveform of each heart beat for deriving a signal, such as a rectangular wave, which commences substantially with the occurrence of the maximum amplitude of the S wave of each complex waveform, and has a duration which is substantially equal to the maximum time-widening expected of the QRS portion of an abnormal heart beat waveform. The interval of the rectangular wave is used by sampling means as a sampling interval during which the magnitude of the then occurring portion of a corresponding heart beat waveform is determined. During this interval, the magnitude of the normal heart beat waveform is usually quite small, being no more than the maximum of the S wave. However, should heart beat pulse widening occur, the R wave, which is considerably greater in amplitude than the S wave, will be detected, at least in part, during sampling. Thus, the invention also includes means responsive to samples above a predetermined magnitude, thereby discriminating between normal and widened heart beat waveforms.

Referring now to FIG. 1 there is shown an embodiment of the present invention comprising input terminal 20 adapted to have applied thereto a train of electrocardiographic signals. As shown in FIG. 2A, in idealized form, the usual electric signal is a complex waveform having a plurality of peaks appropriately identified and known in the art as the P, Q, R, S, and T waves. The ordinate of the waveform of FIG. 2A is the amplitude of the signal and the abscissa is the time base. In the normal heart beat complex, the time interval peak-to-peak from the Q ao S wave and embracing the large R wave is usually substantially invariant and is an interval in the range between 100 and 120 milliseconds. Preferably input terminal 20 is connected to the input of means for providing the sampling signal, which means comprises amplifier 22. Amplifier 22 is conveniently a high input-impedance amplifier which is frequency selective so as to filter out high frequency noise and also has uniform gain over the bandwidth of the expected input signals so that the output waveform is an accurate, amplified reproduction of the clinically significant portions of the input signal.

The means providing the sampling signal further comprises trigger circuit 24 having an input connected to the output of amplifier 22. Trigger circuit 24 preferably is a pulse generator providing, responsively to each negative-going signal (i.e. the Q wave at is maximum amplitude) a short (i.e. 10 microseconds) uniform pulse of fixed amplitude and duration with abrupt rise and fall transitions, such as is shown in FIG. 2B.

Typically, the pulse generator can be a Schmitt trigger circuit or an overdriven amplifier normally biased off (Class C.) The output of trigger circuit 24 is connected to the trigger input of a monostable multivibrator or one-shot 26, i.e. a two-state device having a stable and a quasi-stable state. The one-shot is intended to provide, responsively to a pulse from the trigger circuit, a rectangular pulse (such as is shown in FIG. 2C) having a duration preferably longer than the duration of the normal QRST complex. Of course, subsequent pulses from the trigger circuit will have no effect on the one-shot while the latter is in its quasi-stable state.

The output of one-shot 26 is connected to an input of first delay flop 28. The latter typically is another monostable multivibrator which provides a rectangular waveform having a fixed delay interval which is predetermined to be substantially equal to the time interval between the Q and S wave maxima of a normal heart beat wave complex. Delay flop 28 can be preset, for example, to provide a 110 milliseconds delay or can be adjustable to precisely match the QS time interval of a particular patient. Thus, the leading edge or rise transistion from one-shot 26 triggers delay flop 28 to produce a sharp transition in the latter from its stable to its quasi-stable state wherein the latter remains for the predetermined interval, e.g. 110 milliseconds. Delay flop 28 finally drops back to its stable state without further triggering thus providing an output which is a substantially rectangular wave of fixed amplitude and duration, typically as shown in FIG. 2D.

The output of delay flop 28 is connected to an input of a second delay flop 30 designed to be triggered by the decay or negative-going transition of the output of delay flop 28. The time constant or delay of delay flop 30 is predetermined so as to be substantially equal to the time interval between the occurrence of the maximum amplitude of the S wave and the beginning of the T wave of the normal heart beat wave complex, e.g. about 50 milliseconds. This interval is also approximately equal to the maximum amount of widening in time expected in the case of QRS widening. Thus, the output of second delay flop, as shown in FIG. 2E is the desired sampling signal in the form of another rectangular pulse having its rising or leading edge substantially coincident with the trailing or decay transition of the rectangular waveform from delay flop 28, and having an abrupt decay transition itself occurring about 50 milliseconds later.

As a sampling means there is provided relay driver amplifier 32 having its input connected to the output of second delay flop 30, so as to provide sufficient power to drive a relay in accordance with the waveform of the second delay flop. The output of the relay driver amplifier is connected through relay solenoid 34 to ground.

Terminal 20 is also connected to the input of amplifier 36, which is preferably an absolute value amplifier, i.e. provides an output signal which is the absolute value of the input signal, thus ignoring the polarity of the latter. The output of amplifier 36 is connected through first resistor 38 to junction 40. Connected between junction 40 and ground is a charge storage device such as capacitor 42. Switching means, in the form of armature 44 of a relay driven by solenoid 34, is provided for connecting junction 40 to ground when armature 44 is in its closed position. In the preferred embodiment, resistor 38 is much larger than resistor 46, for example, the former can be 1 megohm or greater while the latter is usually about 100 ohms for each microfarad of the capacitance of capacitor 42. The purpose of resistor 46 is simply to prevent a complete short circuit of electrical current through armature 44 which might damage the latter. Armature 44 is normally biased into a closed position whereby junction 40 is connected to ground through resistor 46.

As means responsive only to samples above a predetermined magnitude, there is provided level detection circuit 48 having its input connected to junction 40. Circuit 48 typically is a high input impedance, thresholding amplifier, a unijunction transistor or the like. The output of circuit 48 is connected to detector device 50 which can be a meter, or preferably is a triggerable alarm device, either visual or audible.

In operation, responsively to the complex waveform of a normal heart beat as shown in FIG. 2A, solenoid 34 is energized only during the time interval of the pulse shown in FIG. 2E. This serves to move armature 44 to its open position, allowing the output of amplifier 36 to charge capacitor 42 through resistor 38. The magnitude of the potential thus rises at terminal 40, and as seen in FIG. 2F, is low and considerably below the thresholding level of detection circuit 48, which level is shown as a dotted line in FIG. 2F. Thus, the output of the level detector, shown in FIG. 2G, remains in its steady or zero state and no indication is provided by indicator device 50, as is shown in FIG. 2H.

Referring now to FIG. 3 there will be seen waveforms showing the operation of the circuit where a QRS widened pulse (an idealized form of which is shown in FIG. 3A) is applied to or arrives at terminal 20. In such instance, the Q wave triggers circuit 24 to provide pulses as shown in FIG. 2B. This initiates a train of events shown in FIGS. 3C, D, and E which are identical to those shown in FIGS. 2C, D and E to provide exactly the same sampling pulse or interval.

The relay solenoid 34 is actuated thereby so that armature 44 opens, allowing capacitor 42 to charge up to a potential determined now by the magnitude of that portion of the R wave which is sampled during the interval of the pulse of FIG. 3E. Thus, junction 40 rises to a potential considerably above the thresholding level all as shown in FIG. 3F. Of course, when the sampling pulse terminates, causing armature 44 to assume its normally closed position, capacitor 42 is very quickly discharged to ground through small resistance 46. Thresholding amplifier 48 responds to the potential at junction 40 above the thresholding level, thereby providing a short pulse determined by the interval during which the potential at junction 40 was above the thresholding level. This pulse, shown in FIG. 3G, initiates or actuates indicator device 50 to change the condition of the latter for example from "no alarm" to "alarm," as is graphically shown in FIG. 3H. Clearly, then the alarm provided by detector device 50 will only occur when a complex wave train exhibiting QRS widening is present at terminal 20.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus for detecting QRS widening in a heart beat waveform in a train of electrocardiographic heart beat waveforms, said apparatus comprising;

first means responsive to each waveform of said train for providing a first signal commencing substantially after a fixed delay following the occurrence of the maximum amplitude of the Q wave of said waveform and terminating a fixed interval thereafter;

second means for sampling the magnitude of each said waveform during said interval responsively to said first signal; and third means responsive only to samples above a predetermined magnitude taken by said second means, for providing a second signal indicative of said QRS widening.

2. Apparatus as defined in claim 1 wherein said first means comprises;

means for producing responsively to said each waveform, a first rectangular pulse having its rise transition substantially coincident with the maximum amplitude of the Q wave, said fixed delay being approximately equal to the period between amplitude maxima of the Q and S waves of normal, unwidened waveforms, and means responsive to the decay transitions of each said first pulse for providing said first signal commencing at the time of the decay transition of said first pulse.

3. Apparatus as defined in claim 2 wherein said interval is fixed to be approximately as long as the expected maximum of said QRS widening.

4. Apparatus as defined in claim 1 wherein said second means comprises;

a charge storage device;

means connecting said storage device to the source of said train; and switching means normally closed for connecting the junction of said source and storage device to ground for discharging the later, and being movable to an open position responsively to said first signal for disconnecting said junction from ground, so that said waveforms can charge said storage device only during said interval.

5. Apparatus as defined in claim 4 wherein said third means comprises a high-impedance input, thresholding amplifier having its input connected to said junction, the threshold of said amplifier establishing said predetermined magnitude; and indicator means connected to the output of said amplifier.

References Cited

UNITED STATES PATENTS 3,267,934 8/1966 Thornton _____ 128—2.06
3,352,300 11/1967 Rose _____ 128—2.06

WILLIAM E. KAMM, Primary Examiner